UNITED STATES PATENT OFFICE.

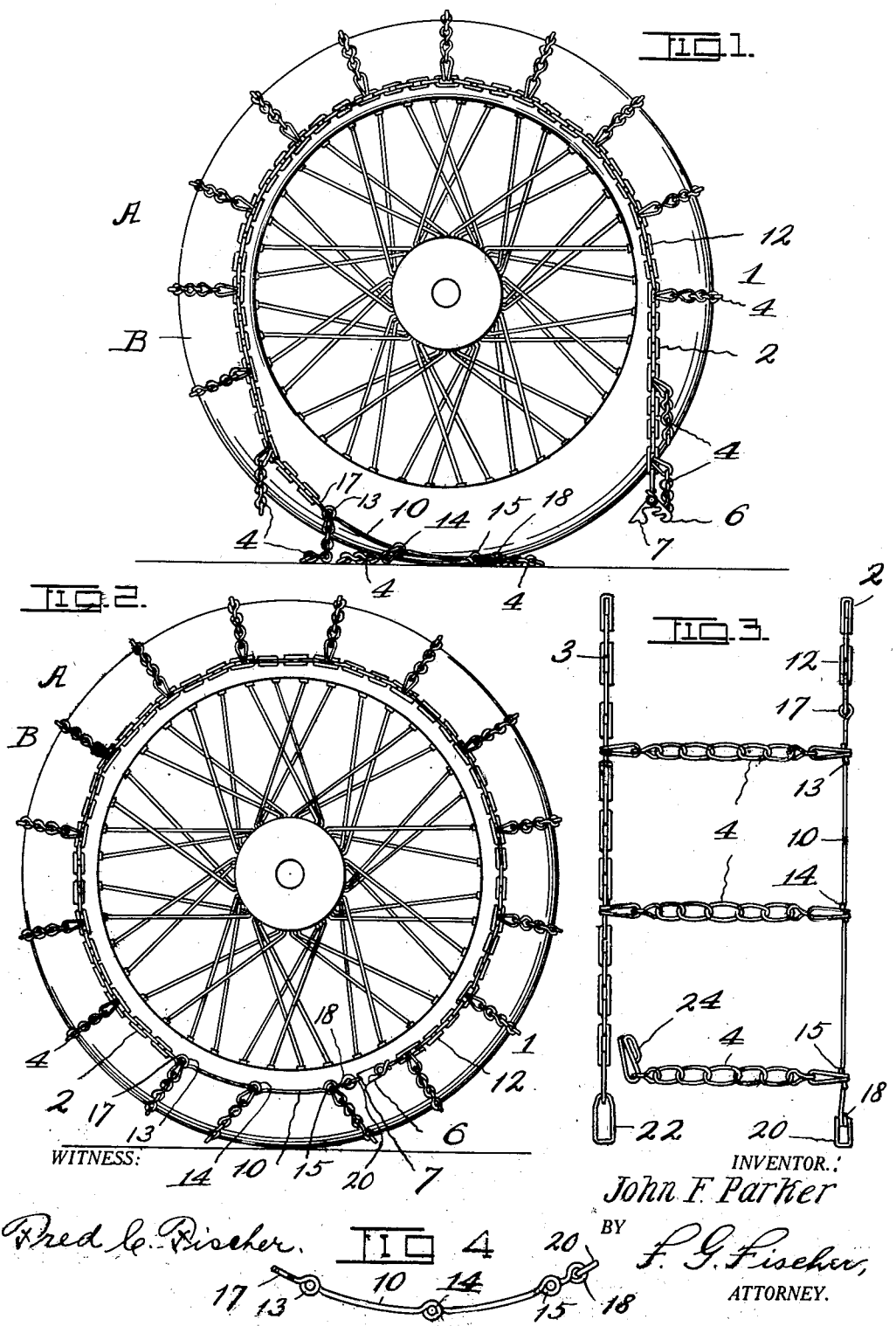

JOHN F. PARKER, OF KANSAS CITY, MISSOURI.

NON-SKID CHAIN.

1,340,182. Specification of Letters Patent. Patented May 18, 1920.

Application filed July 23, 1917. Serial No. 182,193.

*To all whom it may concern:*

Be it known that I, JOHN F. PARKER, a citizen of the United States, residing at Kansas City, in the county of Jackson and State of Missouri, have invented certain new and useful Improvements in Non-Skid Chains, of which the following is a specification.

My invention relates to improvements in nonskid chains for automobile wheels and my object is to provide a chain of this character which may be readily applied to a wheel without jacking up or otherwise moving the same.

An important feature of the invention resides in a stiff member incorporated in the chain and of such length as to extend close enough to the front and rear of that portion of the wheel resting upon the ground to enable said member to be grasped and connected to a loose end of the chain.

Other features of the invention will hereinafter appear and in order that said invention may be fully understood, reference will now be made to the accompanying drawing, in which:

Figure 1 is a side elevation of an automobile wheel with the chain draped over said wheel and in position to have its ends connected.

Fig. 2 is a similar view with the ends of the chain connected.

Fig. 3 is a broken, plan view of one end of the chain.

Fig. 4 is a detail, side elevation of the stiff member constituting an important feature of the invention.

Referring now to the drawing, in which like parts are correspondingly numbered: A designates an automobile wheel upon which the customary pneumatic tire B is mounted.

1 designates a chain embodying the features of the present invention. Said chain embodies two parallel, longitudinal strands 2 and 3 connected at intervals by short, transverse strands 4. One end of each longitudinal strand has a hook 6 for attachment to the opposite end of the strand, each hook having a guard 7 to prevent it from becoming accidentally unfastened.

The longitudinal strand 2 is provided at one end with a stiff member 10, which is substituted for a plurality of links 12, which in the aggregate, equal, or approximately equal, the length of said stiff member 10. In practice, I have found it convenient to employ a stiff member equal to about twice the distance between two transverse strands 4 and provided with three equally spaced loops 13, 14 and 15, to each of which a transverse strand 4 is connected. Eyes 17 and 18 are formed at the ends of the stiff member 10, the eye 17 being connected to one end of the longitudinal strand 2 and the eye 18 being provided with a link 20 for engagement with the hook 6 at the opposite end of said strand 2. The transverse strand 4 connected at one end to the loop 15 is provided at its opposite end with a hook 24, so that it may be disengaged from the strand 3, or hooked in different links thereof.

Preferably the stiff member 10 is made of spring wire having a cross sectional area equal to that of the metal from which the links of the longitudinal strands are formed.

The following is a convenient way of applying the chain to the wheel: The chain is draped over the wheel A, with the strand 2 on the side adjacent to the car body where it is most difficult to gain access to the ends of said strand for the purpose of fastening said ends together. After draping the chain over the wheel, the operator takes his position adjacent the front of said wheel and pushes the stiff member 10 backwardly as far as possible or to the position, approximately, indicated on Fig. 1. The strand 3, which is at the side of the wheel opposite from that on which the car body is located and therefore easily accessible, is then moved backwardly until its link 22 is about even with the link 20. The operator then steps to a point adjacent the rear of the wheel and grasps the rear end of the stiff member 10, pulling it backwardly until the link 20 may be readily engaged with its respective hook 6. The hook 24 is then engaged with the strand 3, the ends of which are then connected, thus completing the operation of securing the chain to the wheel.

By providing the hook 24, or its equivalent the transverse strand 4 connected to the rear loop 15, of the stiff member 10, can be disconnected from the strand 3, to allow said strand 4 to pass behind that portion of the wheel resting upon the ground, without raising or otherwise moving said wheel.

From the foregoing description it will be readily understood that I have produced a chain which can be readily applied to a wheel without raising or otherwise moving the same, and while I have shown and described the preferred form of my invention, I reserve the right to make such changes in the construction, combination and arrangement of parts as properly fall within the spirit and scope of the claims.

Having thus described my invention, what I claim and desire to secure by Letters Patent, is:

1. In a chain of the character described, two longitudinal strands, a hook connected to one end of each of said strands, a stiff member connected to the opposite end of one of said strands and adapted to be engaged and disengaged from the hook at the opposite end of said strand, and short strands connected to the longitudinal strands and said stiff member.

2. In a chain of the character described, two longitudinal strands, a hook on the end of each strand, a stiff member having intermediate loops and an eye at each end, one eye being connected to one of the longitudinal strands, a loop connected to the opposite eye to engage and disengage one of the hooks, and short strands connected to the longitudinal strands and the loops of said stiff member.

3. In a device of the character described, two longitudinal chains of unequal length, a hook at one end of each chain, short transverse chains connected at intervals to said longitudinal chains, a stiff member having a plurality of loops, an eye at one end of said stiff member connected to one end of the shortest longitudinal chain, means at the opposite end of said stiff member for connection with the hook on the shortest longitudinal chain, short transverse chains connected at one end to the loops of the stiff member, and means on the opposite ends of the last-mentioned transverse chains to detachably engage the longest longitudinal chain.

In testimony whereof I affix my signature, in the presence of two witnesses.

JOHN F. PARKER.

Witnesses:
F. G. FISCHER,
L. J. FISCHER.